H. STRONGSON.
NON-SKID TIRE SHOE.
APPLICATION FILED FEB. 15, 1913.

1,083,869.    Patented Jan. 6, 1914.

WITNESSES

INVENTOR
Herman Strongson
BY
ATTORNEYS

UNITED STATES PATENT OFFICE.

HERMAN STRONGSON, OF NEW YORK, N. Y.

NON-SKID TIRE-SHOE.

1,083,869.  Specification of Letters Patent.  Patented Jan. 6, 1914.

Application filed February 15, 1913. Serial No. 748,544.

*To all whom it may concern:*

Be it known that I, HERMAN STRONGSON, a citizen of the United States, and a resident of the city of New York, borough of Manhattan, in the county and State of New York, have invented a new and Improved Non-Skid Tire-Shoe, of which the following is a full, clear, and exact description.

Among the principal objects which the present invention has in view are: to provide an article of the character mentioned having spaced-apart members movable relative the tire to form independent gripping sections arranged to permit the movement of the tire thereon; to provide resilient means for returning the gripping sections to their normal position when permitted to do so; to provide means for adjusting the shoe to wheels and tires of different dimensions; to construct an article of the character mentioned in a manner to permit the removal for repair or replacement, of sections thereof; to construct said article with economy; and to provide an article of the character mentioned, which may be folded or packed within small compass.

One embodiment of the present invention is shown in the accompanying drawings, in which—

Figure 1:
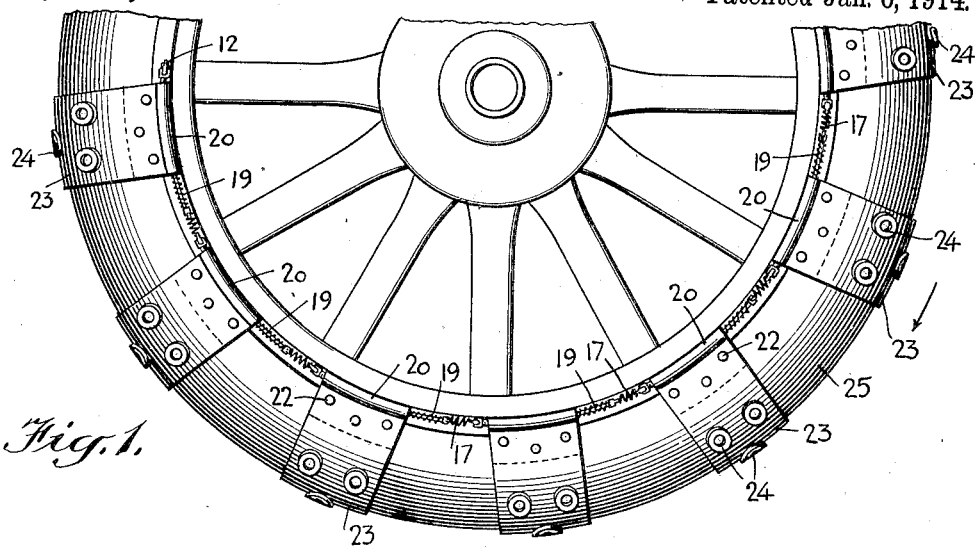
Figure 3:
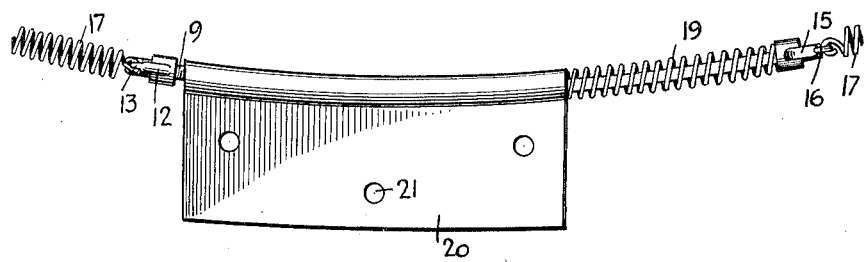
Figure 2:
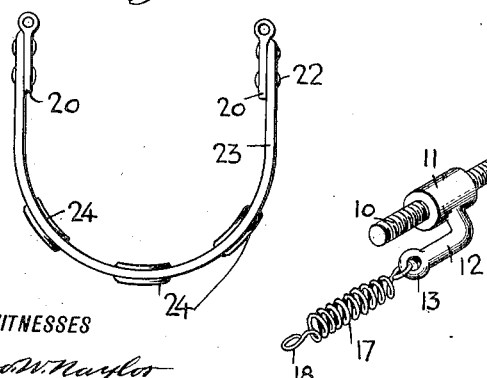
Figure 4:
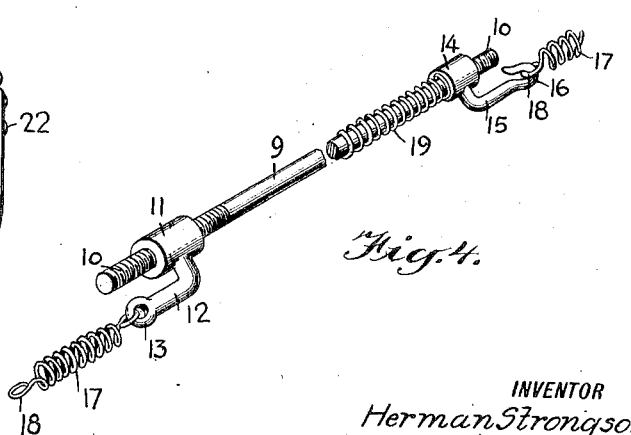

Figure 1 is a side view of a fragment of a vehicle wheel having applied thereto a shoe constructed and arranged in accordance with the present invention; Fig. 2 is an edge view of a shoe section; Fig. 3 is a side view of an attaching plate having a mounting therefor; Fig. 4 is a detail view in perspective, showing an end fragment of a guide rod and an adjusting connecting nut mounted thereon.

As seen in the accompanying drawings, the shoe is constructed of a series of sections. The sections are duplicates, and each is provided with a short guide rod 9, which is bent to a curve, the radius whereof is equal to the distance between the center of the hub and the rim of the average wheel. At each edge of the rod 9 is formed a screw-threaded section 10. Mounted on the threaded sections 10 are nuts 11. One of the nuts 11, as shown in Fig. 4 of the drawings, is provided with an L-shaped arm 12, at the end whereof is formed an eyelet 13. At the opposite end of the rod 9, a nut 14 has an L-shaped arm 15, at the end whereof is formed a hook 16. The nuts 14 are furnished to provide for connecting the various rods 9, to make a complete ring for the support of the gripping sections. Permanently mounted in the eyelet 13 is a spiral spring connector 17. The connector 17 is shaped to form an end loop 18, which, when the rod is adjusted in service position, is engaged with the hook 16. When the engagement is thus effected, by manipulating the nuts 11 and 14, the rods are drawn toward each other, and a pulling strain is imposed on each of the connectors 17. The springs forming the connectors 17 are made from wire stiffer in action than that forming the buffer spring 19 with which each rod is provided. Between the nuts 11 and 14 are mounted on each rod a hanger plate 20 and a buffer spring 19. The spring 19 operates to normally move the plate 20 upon which it bears, toward the opposite end of the rod 9, to rest against the nut 14. When, however, a pulling strain is exerted upon the gripping section with which the plates 20 are connected, the spring 19 yields to permit said plates to slide on the rods 9. The connectors 17, as above stated, have sufficient strength to hold the rods 9 in their initial position until after the spring 19 has been collapsed. Thereafter, and prior to the exertion of a breaking strain upon the structure, the springs 19 yield to permit a separation of the rods 9, and to relieve the structure when a pulling strain is exerted upon the gripping sections. Each of the plates 20 is furnished with rivet holes 21, through which rivets 22 are passed when mounting on said plates the flexible grippers 23. Each of the grippers 23 consists of a short length of flexible material, and is rigidly secured at both ends to a plate 20. The grippers 23 may be constructed from any suitable material and may be provided with any suitable engaging devices, such as rivets 24, shown in the drawings.

When the shoe is removed from the tire 25, the grippers 23 may be straightened lengthwise and in this position be folded one upon the other, thus forming a condensed package. When the shoe is to be adjusted, this is easily accomplished by spreading the grippers over the tire and joining the loose or disconnected ends of any of the rods 9 by means of the eyeleted arm 12 and the arm 15, the connector 17 being extended to engage the hooks 16.

The operation of the shoe, when in service position, is as follows:—When each of the grippers 23 engages the roadbed, it is permitted to slide on the rod 9 against the spring 19 which is mounted on said rod. The independent action of the gripper permits the necessary time for the end suction devices, such as the rivets 24 or the material of which the grippers are constructed, to effectively engage the roadbed before the torque strain of the wheel is transferred to the gripper. When the wheel rotates into the position to lift the gripper from contact with the ground, the spring 19 immediately moves said gripper to its initial position. In this manner, allowance is made for the inertia of the rotating wheel during the period of skidding, while providing means for setting in engagement the grippers of the shoe.

Having thus described my invention, I claim as new and desire to secure by Letters Patent:—

A tire shoe, comprising a plurality of ring segments; a plurality of movable connecting devices mounted on each of said segments; a plurality of connecting springs united to and extending between said segments; a plurality of cushion springs, one mounted on each of said segments; a plurality of sliding connecting plates, one mounted on each of said segments; and a plurality of U-shaped flexible gripper sections rigidly connected at their ends with pairs of said connecting plates.

In testimony whereof I have signed my name to this specification in the presence of two subscribing witnesses.

HERMAN STRONGSON.

Witnesses:
E. F. MURDOCK,
PHILIP D. ROLLHAUS.